INVENTORS
GERALD F. BINNINGS
THEODORE N. MEYER
MEL J. RILEY

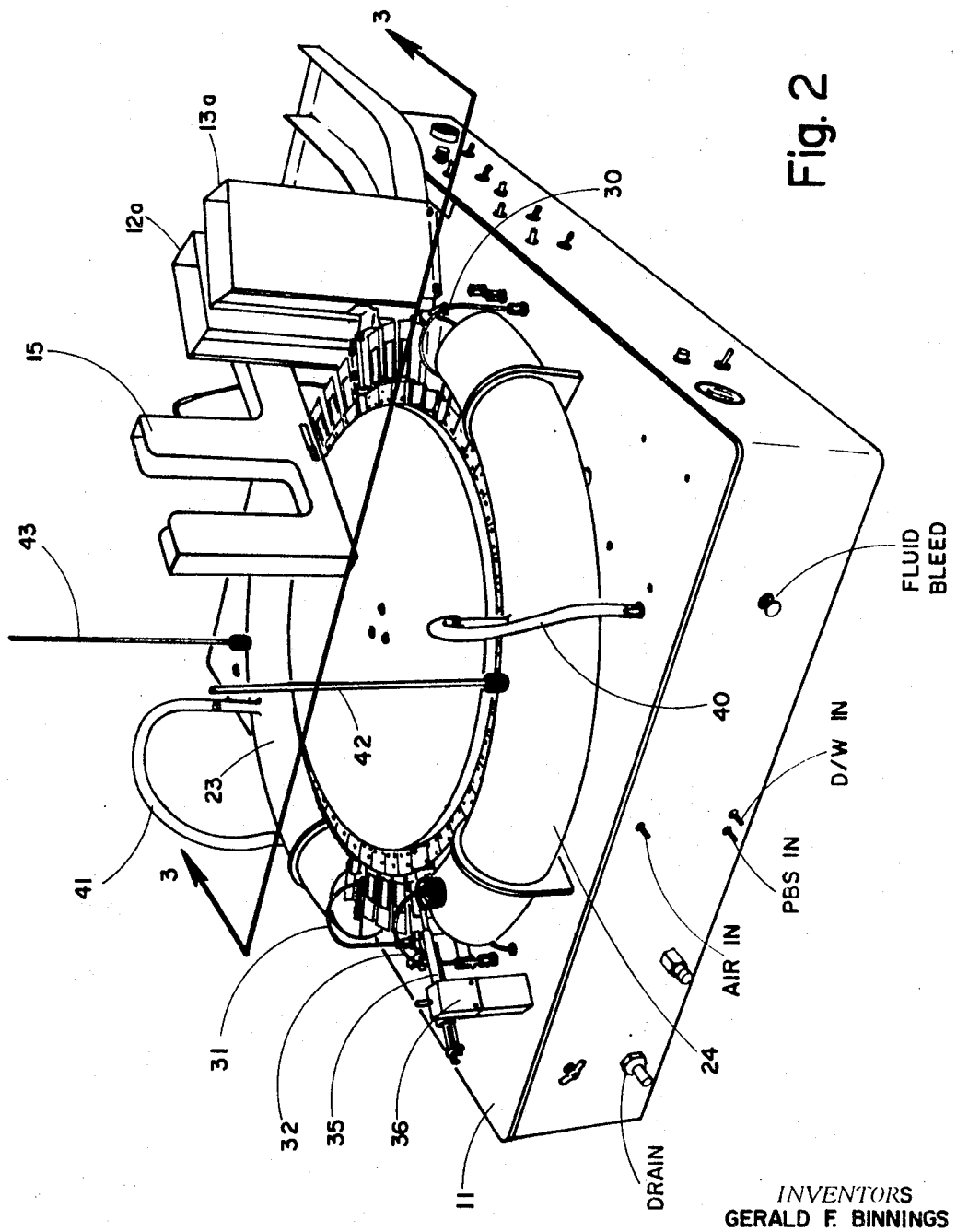

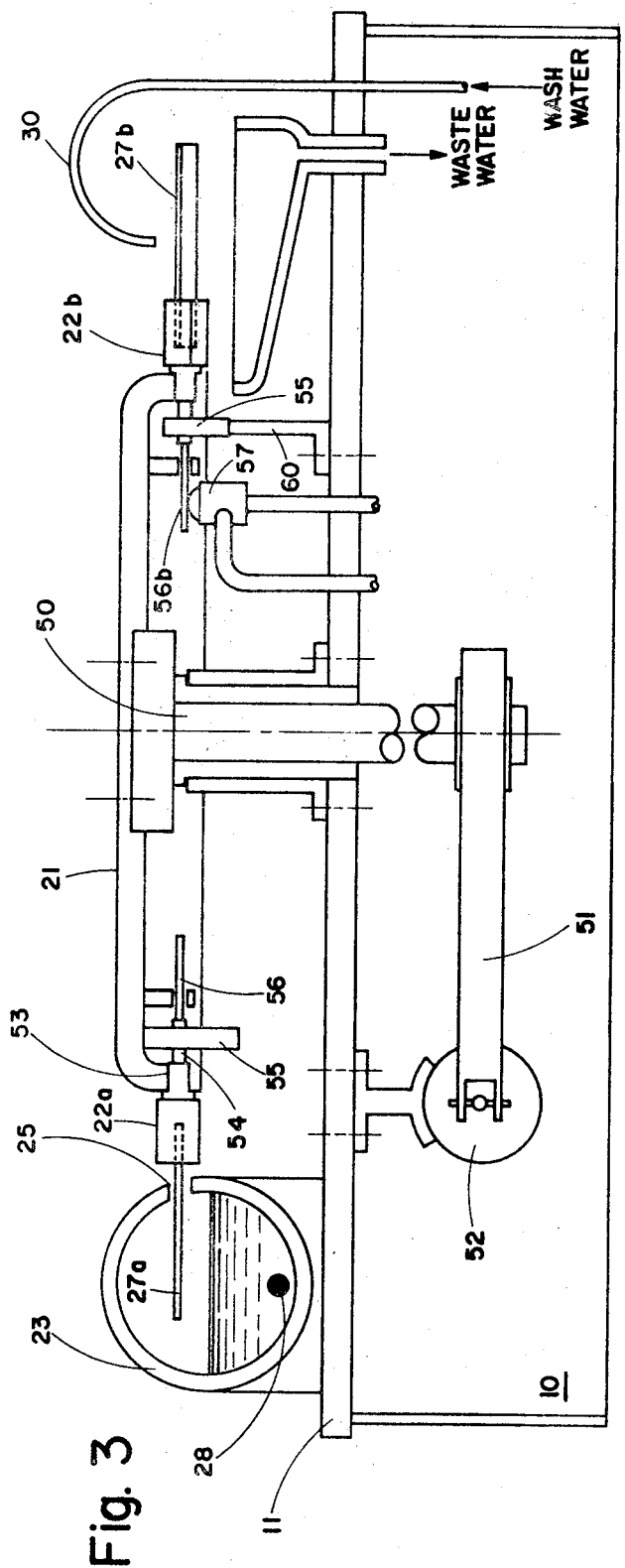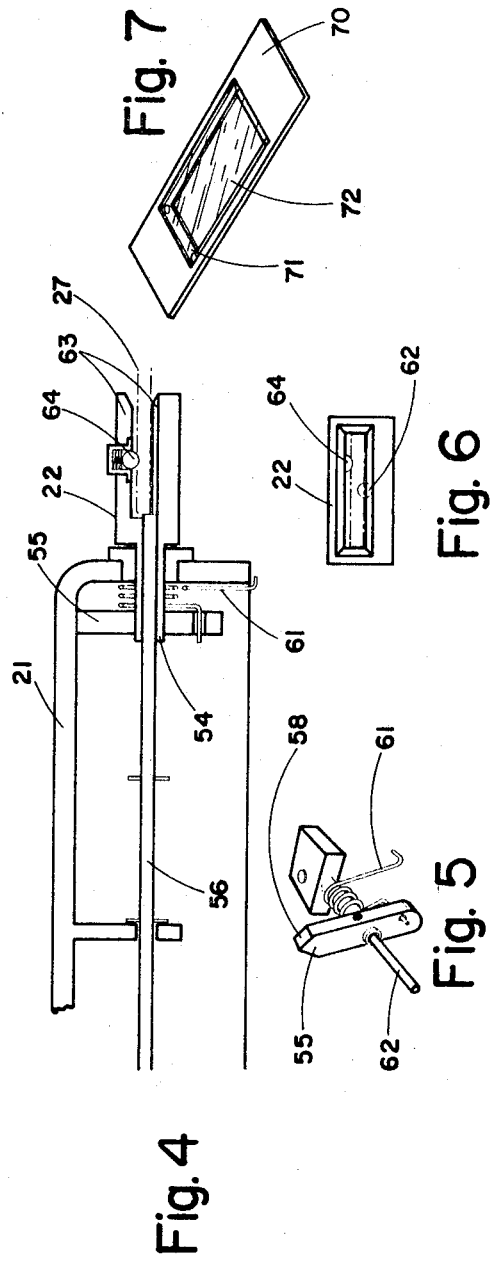

April 6, 1971 G. F. BINNINGS ET AL 3,574,064
AUTOMATED BIOLOGICAL REACTION INSTRUMENT
Filed May 9, 1968 9 Sheets-Sheet 4
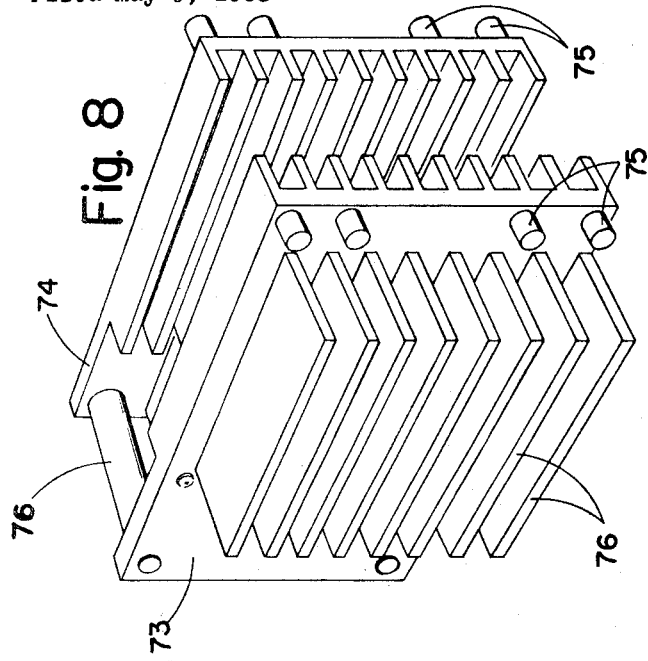
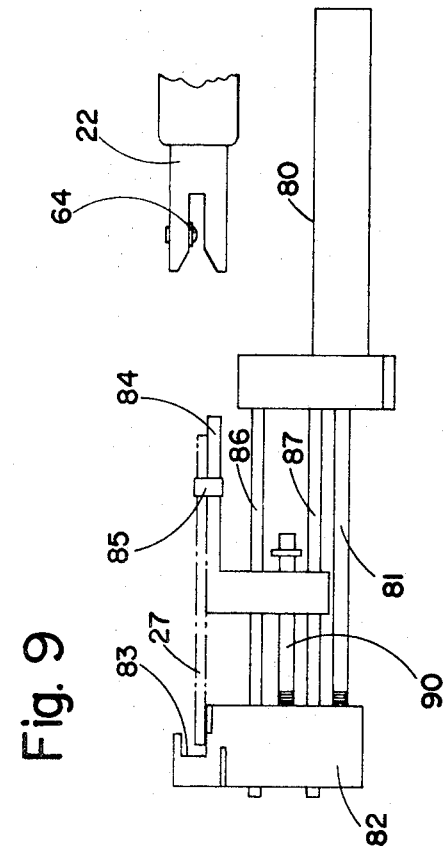
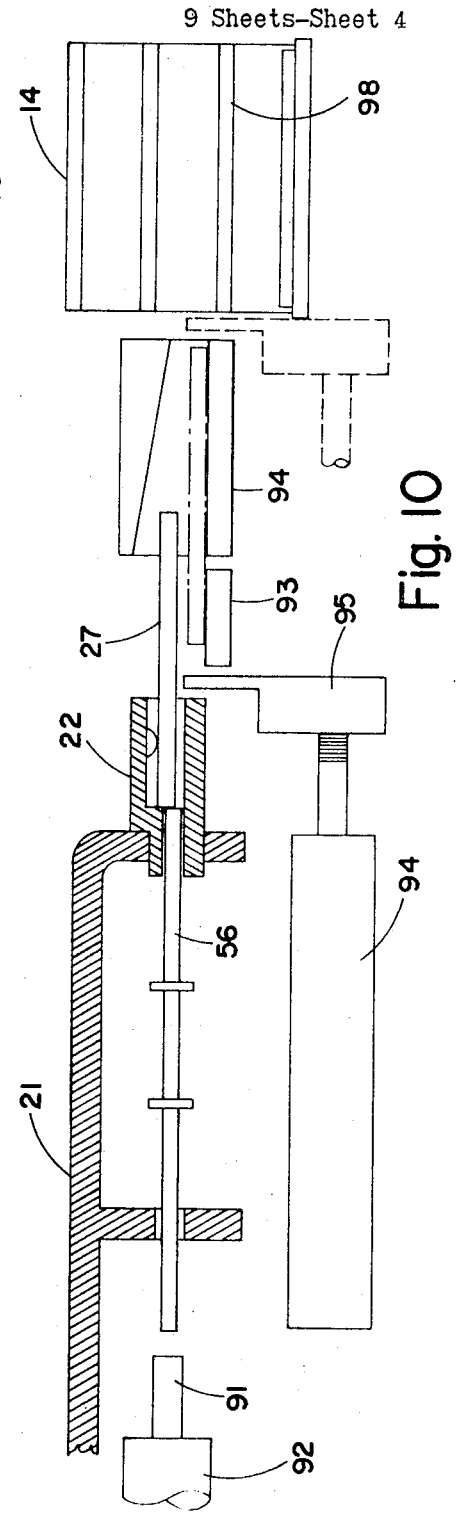
INVENTORS
GERALD F. BINNINGS
THEODORE N. MEYER
MEL J. RILEY
by John E. Wagner
Edward O. Ansell

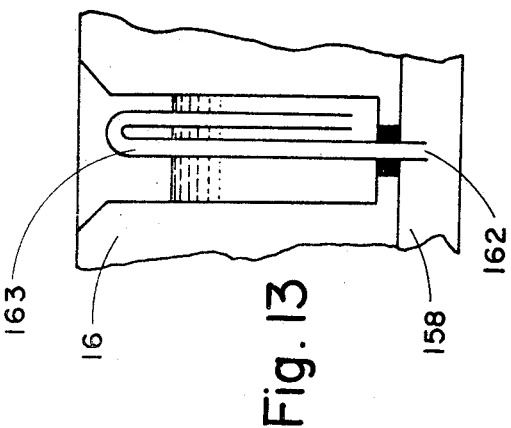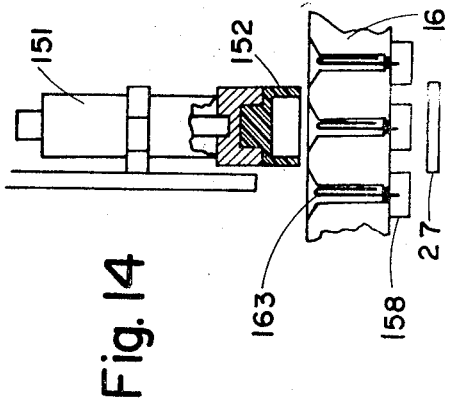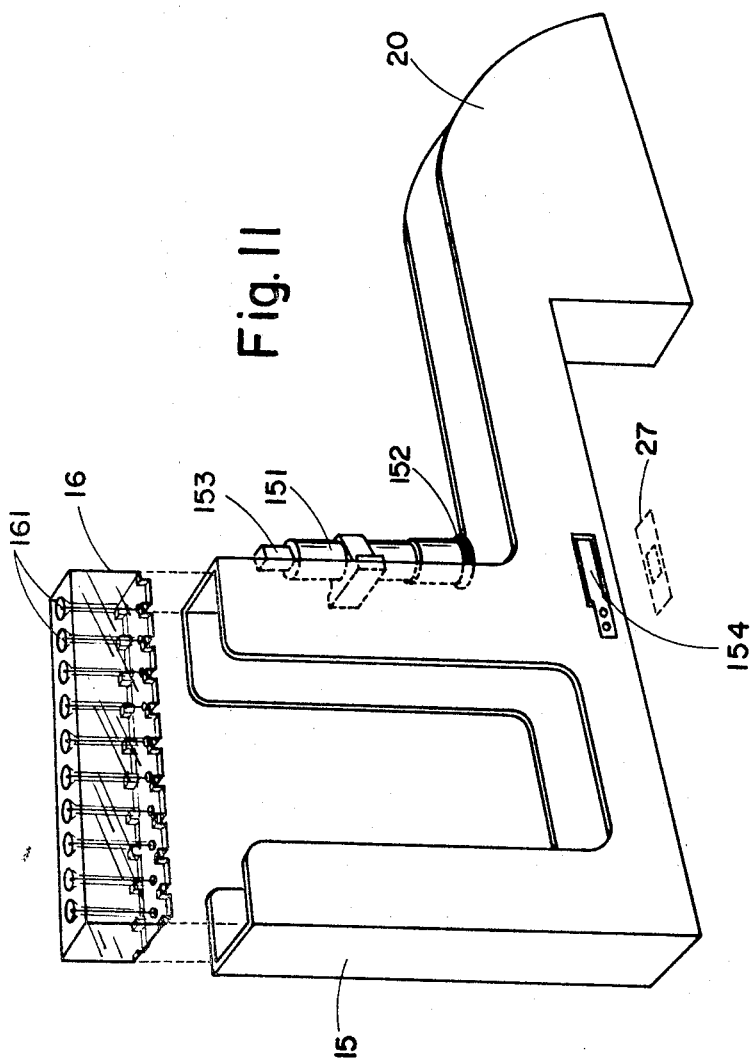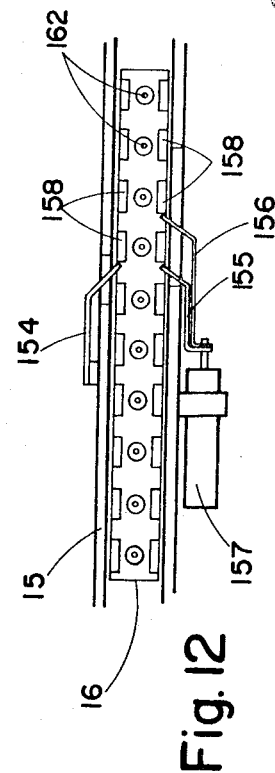

April 6, 1971 G. F. BINNINGS ET AL 3,574,064
AUTOMATED BIOLOGICAL REACTION INSTRUMENT
Filed May 9, 1968 9 Sheets-Sheet 6

INVENTORS
GERALD F. BINNINGS
THEODORE N. MEYER
MEL J. RILEY

United States Patent Office 3,574,064
Patented Apr. 6, 1971

3,574,064
AUTOMATED BIOLOGICAL REACTION INSTRUMENT
Gerald F. Binnings, Arcadia, Theodore N. Meyer, Westminster, and Mel J. Riley, Covina, Calif., assignors to Aerojet-General Corporation, El Monte, Calif.
Filed May 9, 1968, Ser. No. 727,859
Int. Cl. C12k 1/10
U.S. Cl. 195—127                            7 Claims

ABSTRACT OF THE DISCLOSURE

This disclosure describes apparatus for automatically processing special laboratory slides carrying specific antigenic material with samples of blood serum taken from patients to detect the presence of specific antibodies in the serum as an indication of previous exposure to the antigen. Specifically, the disclosure describes the apparatus as applied to the fluorescent treponemal antibody (FTA) test for syphilis using an indirect fluorescent antibody technique with *T. pallidum* (nichols strain) as the antigen. The apparatus of the invention includes a mechanism for discharging from a magazine a number of antigen carrying laboratory slides onto a rotating carrier and the dispensing of samples of patients serum onto the laboratory slides. This is followed by the incubation of the slide carrying the previously fixed antigen and the patients serum for several minutes to allow the reaction of any specific antibodies in the serum with the fixed antigen. The apparatus further includes means for washing to remove excess serum, means for injecting a conjugate which reacts with the human serum affixed to the antigen and carries a fluorescent tag such as fluorescein isothiocyanate. The apparatus includes means for further incubation to insure the reaction between the antigen-antibody complex and the conjugate followed by further washing and discharging of the reacted slides to an off-loading mechanism for subsequent examination under a laboratory microscope.

Our invention relates to medical instrumentation and, more particularly, to apparatus for automatically processing specimens of human blood serum for the detection of specific antibodies.

BACKGROUND

Field of the invention

This invention relates to the field of automation of biological processes related to medical diagnostic techniques. The need has been recognized for a number of years for the simplification and automation of biological testing processes in the medical arts. Laboratory techniques in general have required highly skilled personnel to perform a number of manipulative steps interspaced by reaction times and in reaction chambers. Only the best managed laboratories can manage to effectively use the time of the laboratory personnel in making a variety of tests and tests which require the processing periods ranging from two minutes to twenty-four hours. In addition to the problems of planning and carrying out the tests, the nature of most of the steps in laboratory processing require a high level of skill to assure reliable results but offer little challenge to the highly skilled personnel. It is therefore we recognize that whenever the manipulative steps of biological testing can be performed automatically, the time and attention of the skilled personnel can thereby be concentrated on the analysis and readout phases of the procedure where their skill is truly required. As an example, in one particular test, the fluorescent treponemal antibody absorbed test, it is commonly performed with laboratory specimens on slides with reagents and serum reacted for approximately 30 minutes under prescribed humidity and temperature conditions followed by further reaction and further incubation for approximately 30 minutes. These steps can be performed in a superior way when automated.

This invention involves an apparatus for automating the fluorescent treponemal antibody test and by the very nature of the apparatus, it is adaptable to the performance of other similar biological tests.

Automated biological testing has been accomplished in the past employing a number of techniques for sample handling including capillary tubes, test tubes, continuous tube flow systems with samples isolated by air bubbles, and on continuous tape mediums. Each of these arrangements have certain advantages and disadvantages as well. Transporting samples by test tube is a classic mode of handling liquid laboratory reagents. Large volume testing (100–1000 tests per day) using standard or micro test tubes becomes cumbersome in handling, processing and cleaning. Capillary tubes in the form, for example, of 2″ length glass 1/16″ O.D. tubing with a capillary bore are useful in carrying small samples, mixing reagents and, due to capillary attraction, do not normally discharge the fluid carried in the absence of a sharp axial blow or the application of pressure to one end of the bore. Tapes of either porous or impervious structure have been used to carry individual samples of reagents and a system of this type is disclosed in the co-pending patent application assigned to the assignee of this invention, Ser. No. 459,526. Examples of the previous types of apparatus mentioned are U.S. Pat. 2,826,076, 3,128,239 and 3,036,893 showing porous tape transport systems. Capillary tube devices are shown in Pat. 3,216,804 and 3,219,416. Systems using continuous tube transport of samples with air bubbles separation are represented by Pats. 3,241,432, 3,241,923 and 3,252,327. An example of a test tube sample container for automated apparatus is disclosed in the Pat. 3,350,946. In each of the sample conveyances described above, the sample reactions are not performed on a medium directly visable in laboratory microscope examination as is at present necessary for the FTA test. Consequently, none of the above techniques are suitable for application to this or related tests.

SUMMARY

Briefly, this invention involves an automatic laboratory slide processor made up of a turntable having a plurality of peripheral slide holders for carrying and manipulating slides through various work stations arranged in a circular array around the turntable.

The apparatus includes in particular a pair of arcuate incubation chambers including an edge slot of dimension sufficient to allow laboratory slides to enter edgewise at one end of the arcuate chamber and pass through and out the opposite end while maintained in a predetermined temperature and humidity condition during passage. The apparatus also includes stations adjacent to the incubation chambers for washing, applying conjugate material, and drying the surface of the laboratory slides.

At one point along the periphery of the turntable is a slide magazine holder and slide loader for sequentially introducing the slides from slide magazines onto the slide holders of the turntable. Beyond the input slide station is a serum-sorbent injector designed to move sequentially small reservoirs of patient's serum into position over each succeeding slide and means for ejecting a measured quantity of the serum-sorbent onto the surface of the slide so as to contact antigenic material previously fixed to the slide. Behind the slide loader at the end of the cycle is a slide unloader into which the completely reacted slides are ejected from the turntable at the completion of a cycle.

The system includes actuating mechanism, timing, and supplies of the various reagents so that upon actuation of a power switch the mechanism is operative to load in the order of 50 slides onto the turntable, react 50 samples, with the antigenic material on the slides, process the slides and reload magazines with the completely reacted slides for subsequent examination under a laboratory microscope.

One feature of this invention resides in the combination of the slide-carrying turntable cooperating with a number of reaction assemblies positioned around the periphery for producing a continuous biological reaction system.

Another feature of this invention resides in the serum-sorbent stations which are designed to carry measured quantities of serum-sorbent and by merely the application of local pressure emit a precise sample onto the surface of the slide for reaction thereon as the slide is transported.

Other features of the invention reside in the use of arcuate incubation chambers designed to accept laboratory slides for continuous incubation while carried by a central turntable.

One other feature of the invention resides in the novel liquid reagent dispenser employing siphon action to produce accurate metering of reagents without leakage.

The above features of the invention may be more clearly understood from the following detailed description and by reference to the drawing in which FIG. 1 is front elevational view of the apparatus in this invention designed to process;

FIG. 2 is a perspective of a modification of the apparatus of FIG. 1 showing the turntable and arrangement for handling stacked slides;

FIG. 3 is a sectional view of the apparatus of FIG. 1 of this invention taken along line 3—3 of FIG. 2;

FIG. 4 is a fragmentary section of the turntable of the apparatus of this invention through the slide holder;

FIG. 5 is a prospective view of the slide-tilt actuating arm of the assembly of FIG. 4;

FIG. 6 is an end view of the slide holder of FIG. 4;

FIG. 7 is a perspective view of the special laboratory slide used in conjunction with the apparatus of this invention.

FIG. 8 is a perspective view of a slide magazine used in conjunction with the apparatus of FIG. 1;

FIG. 9 is a side elevational view of the slide loading mechanism of the apparatus of FIGS. 1 and 2;

FIG. 10 is a fragmentary vertical sectional view of the turntable and slide unloading mechanism of the apparatus of FIGS. 1 and 2;

FIG. 11 is a perspective view of the serum-sorbent magazine and applicator and a serum-sorbent block;

FIG. 12 is an underside fragmentary view of the apparatus of FIG. 11 showing the serum block advancing mechanism;

FIG. 13 is a fragmentary section of one cavity of the serum-sorbent block in FIG. 11;

FIG. 14 is a simplified elevational view of the serum-sorbent applicator of the apparatus of FIG. 11;

Figure 1:
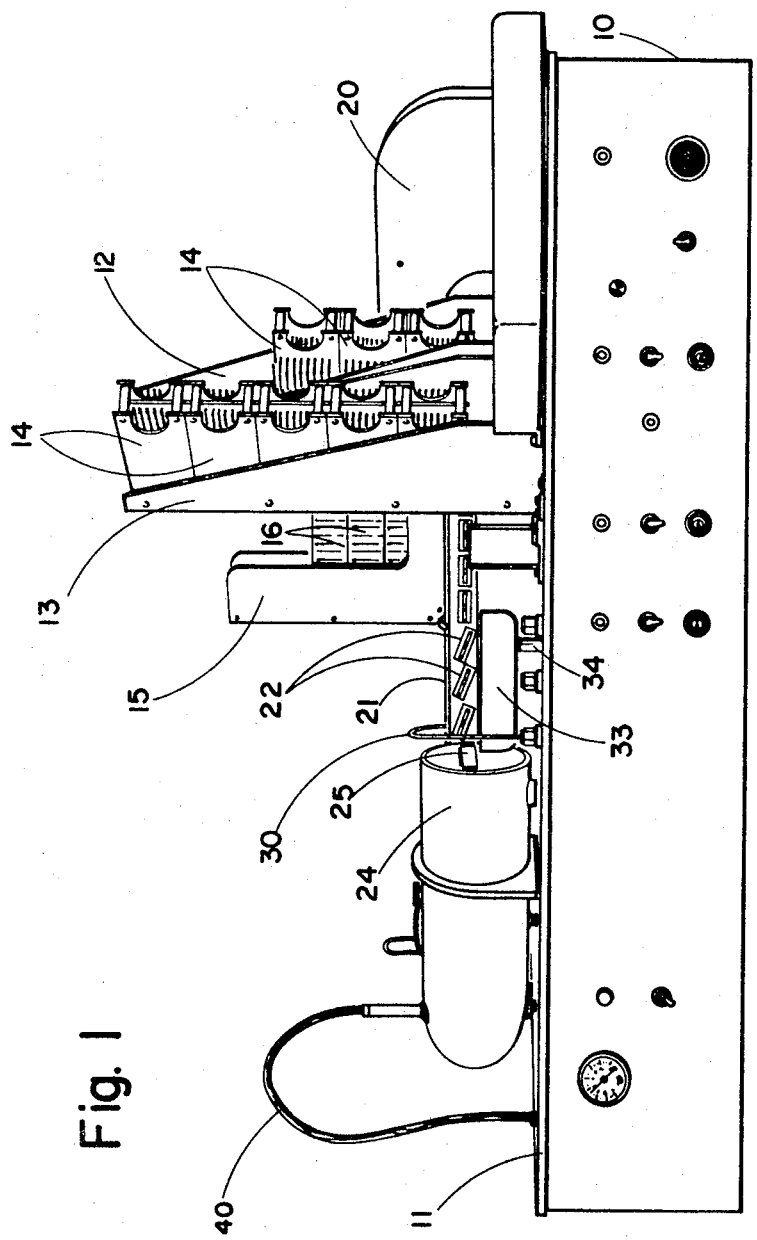

Now referring to FIGS. 1 and 2, the automatic slide processing apparatus of this invention may be seen as comprising a housing 10 containing the pneumatic and electrical operating subsystems and having an upper surface constituting base 11 upon which the slide processing fixtures are mounted. The fixtures include a magazine loading rack 12 and a magazine unloading rack 13 each designed to hold a plurality of magazines 14 or in other embodiments, stacked laboratory slides. Behind the loading and unloading racks 12 and 13 is a serum-sorbent applicator 15 including a magazine portion designed to hold a number of serum-sorbent blocks 16 which are described in more detail in connection with FIGS. 9—12 and the rack 15 also including an outlet chute portion 20 for discharging used-serum-sorbent blocks. The racks 12, 13 and 15 are arranged at the periphery of a central turntable 21 having a number, for example, 50, laboratory slide holders 22 radially positioned on the periphery of the turntable 21. A pair of arcuate-shaped incubation chambers 23 and 24 as seen in FIG. 2 are oppositely positioned around the periphery of the turntable 21 and each are provided with end slots, for example, slot 25, which allows the entrance, passage, and discharge of laboratory slides carried by slide holders 22. The two arcuate incubation chambers allow for incubation periods in carrying out the FTA (absorb) tests as described below in connection with operation of the machine. The apparatus includes a trio of wash stations, including wash supply tubes 30, 31 and 32, the last of which appear in FIG. 2, each having a sink and drain comparable to the sink 33 and drain tube 34 associated with the tube 30.

The remainder of the working apparatus on the base 11 constitutes a conjugate applicator 35 as seen in FIG. 2 and constituting a calibrated incrementally actuated syringe, for example, of a type similar to the Cornwall Automatic Pipetter commercially available from Becton-Dickenson & Co., Rutherford, N.J. The syringe is mounted from the base 11 by support column 36. Other features of the working apparatus are the shielded electrical leads 40 and 41 for thermistor probes positioned within the humidity chambers 23 and 24 to measure the air temperature and thermometers 42 and 43 extending the incubation chambers 23 and 24 to measure the air temperature. Both chambers 23 and 24 are heated by internal immersion heaters not shown in the drawing. The tanks are filled with distilled water up to ¼" of the edge slot 25 and heated to maintain an air temperature of 37° C. and a relative humidity in the order of 85%—100°.

The exterior of the base 10 contains a number of function switches, gauges and other indicators related to the operation of the device which will be described in connection with their respective functions. As may be seen in FIG. 2, the side of the base 10 contains inlets and outlets for the operating fluids of the apparatus.

In order to understand the rotating turntable 21 and its associated mechanism, reference thereby made to FIG. 3, which is a vertical section through the apparatus of this invention taken along line 3—3 of FIG. 2. The turntable 21 is mounted on shaft 50 supported on the base 11 and rotated incrementally by actuating arm 51 driven by air cylinder 52 secured to the underside of the base 11. Two of the peripheral slide carriers 22a and 22b may be seen in FIG. 3. Slide carrier 22a holds a laboratory slide 27a cantilevered through slot 25 into the incubator 23 in the air space above the surface of the body of water contained in the lower half of the incubator 23. The immersion heater 28 extends through the water retaining its operating temperature.

The slide holder 22a is journalled in an opening 53 in the skirt of turntable 21 and includes a shaft extension 54 which carries a slide-tilt arm 55 riding on the underside of the turntable 21 and spring biased as can be seen in FIG. 5 to maintain the slide normally in a horizontal position. The slide holder 22a also includes a slide ejector rod 56a extending toward the axis of the turntable.

The slide holder 22b at the opposite side of turntable 21 is shown positioned with the rod 56b engaging the spring-loaded ball operator of valve 57 controlling the flow of wash water to the spray tube 30 positioned with its outlet directly over the reaction zone of the slide 27b. It should be noted from the drawing FIG. 3 that the slide 27b and slide holder 22b are tipped to allow the wash water to flow across the slide and flow freely off without any residual water left on the surface. The tipping of the slide is accomplished by the slide-tip arm 55 engaging a fixed ramp or cam 60 secured to the base 11 on the periphery adjacent to the wash station at tube 30. A coaction between the slide-tip mechanism at the wash station and the slide ejector pin 56 operating valve 57 allows each slide in sequence as it reaches the wash station to be tipped and flushed with wash water. As the turntable 21 is advanced beyond the wash station, the flow of wash water is terminated and as the slide-tip arm 55 leaves the ramp 60 after a drain period of two stations, the slide 27b is returned to its normal horizontal position.

The details of the slide-tip mechanism may be more clearly seen in FIGS. 4 and 5 with the upper surface 58 of the slide-tip arm 55 resting against the underside of turntable 21 and the lower arm engaging return spring 61. The shaft 54 may be seen in these figures to be hollow and slide ejector pin 56 extends through the center into the base of the jaws 63 of the slide holder 22. A laboratory slide 27 is shown in phantom resting in the jaws 63 of the slide holder 22 and restrained by spring-loaded ball 64. The rod 56 is shown in its normal retracted position. From FIG. 5, the configuration of the slide arm 55 can be seen, including an upper surface 58 which normally bears upon the underside of the turntable 21. FIG. 6 shows an end view of the slide holder 22 with the ball detent 64 appearing toward the right of center within the jaws 63 and the ejector pin to the center lower edge of the slide holding jaw.

The special laboratory slide used in connection with this apparatus is shown in perspective in FIG. 7 as including a relatively rigid body 70 with dimensions comparable to the normal glass laboratory slide, namely 25 x 75 mm., including the central rectangular opening 71 in the central portion covered by a thin flat glass slip 72 which is recessed flush with one surface of the plastic body 70. The reaction on the apparatus occurs on the upper flush surface of the planar glass slip 72.

Now referring to FIG. 8, one of the magazines 14 used to hold a number of slides is shown in perspective. It includes a pair of sides 73 and 74 joined by central columns 76 at one end with the opposite end open to receive slides each in their own respective slot. At the open end are a number, for example, of 8 guide pins 75 to facilitate alignment of the magazines in the loader and unloader mechanisms. On one side are a number of index planes 76 extending laterally which in use will engage magazine advance teeth in the unloader unshown in the drawing. Suffice it to say that each magazine carries a number of slides in a horizontal position and are open at one end to allow the dispensing of slides then received after processing. The slide loading mechanism is shown in FIG. 9, including an actuating cylinder 80 with its associated piston rod 81 carrying feeder block 82 having an upper recess 83 for receiving the end of a slide shown in dash-dot lines and resting on table 84 between guide ears 85, one of which appears in drawing 9. The feeder block 82 actuated by piston rod 81 rides on guide rods 86 and 87 in advancing both the block 82 and the table 84 carrying the slide until the end of table 84 engages the lower receiving lip of slide carrier 22 whereupon the slide 27 is driven home into the slide holder 22 and held by the ball detent 64. The piston rod 81, follower 82 and table 84 then are in condition to retract to the position shown in the drawing ready to receive the next slide 27 from the magazine of the type shown in FIG. 7a. The slide loading mechanism of FIG. 9 is largely contained in the base of the loading rack 12 of FIG. 1 and positioned to operate between the slides 73 and 74 of each magazine 14.

Next the details of the slide ejection and unloader may be seen in FIG. 10. It includes a fragmentary portion of the turntable 21 carrying a slide holder 22 and slide 27. The ejector rod 56 is in its normal retracted condition. A piston 91 actuated by cylinder 92 is secured to the base beneath the turntable and when actuated, drives the ejector rod 56 forward thereby ejecting the slide 27 and moving it forward until it falls to rest on tables 93 and 94. Thereafter, cylinder 94 is actuated to operate driving ram 95 forward transporting the slide 27 to its proper shelf 98 of magazine 14. The ram 95 is returned to the rest position by reverse actuation of cylinder 94 and ejector piston 91 to its original position by reverse actuation of cylinder 92.

The other loading and unloading mechanism of the apparatus may be seen in FIGS. 11 and 12. This apparatus known as the serum-sorbent applicator includes the rack section 15 and discharge chute 20 designed to hold and at the correct instant in the cycle, discharge a prescribed volume of serum-sorbent mixture from each of the reservoirs 161 of the serum blocks 16, one of which is shown positioned ready for loading in the rack 15. The serum sorbent blocks 16 rest normally with the first one on the bottom of rack 15 and succeeding serum blocks 16, one on top of each other. On one end panel of the rack 15 is a pneumatic actuator 151, including diaphragm 152 riding on the end of piston 153. The actuator 151 is positioned directly above the reaction spot on the slides 127 shown in phantom below the serum-sorbent applicator. This alignment may be more clearly seen in FIG. 14 described below.

The near wall of the loader 15 includes a fixed spring pawl 154 which cooperates with movable pawls on the opposite side of the loader 15 for holding and advancing the serum blocks 16. Referring now to FIG. 12, which constitutes an underside view of the loader 15 with serum block 16 advanced from the rack toward the discharge opening by cooperation of the fixed pawl 154 movable pawls 155 and 156 step the serum block forward incrementally by engaging lower tabs 158 on the underside of the serum block 16.

As is apparent from FIG. 12, the flexible spring pawl 154 prevents block 16 from moving to the left while movable pawls 155 and 156 will drive the block 16 to the right when the piston of actuator 157 is actuated to the right and when the piston is returned, the spring pawls 155 and 156 will ride over the outer surface of tabs 158 while pawl 154 holds the block in position. In this manner each serum block in turn is stepped incrementally to position to discharge fluid through their respective orifices 162. Discharge is accomplished as may be seen in FIG. 14 where the compressible rubber cup 152 on the bottom of actuator 151 piston engages the upper surface of block 16. Further movement downward after the lip of cup 152 seals the reservoir produces a slight positive air pressure in the reservoir. As is apparent, each reservoir includes a siphon tube 163 communicating between the fluid in the reservoir and the outer tube 162. Siphon tube 163 is shown in more detail in FIG. 13. The quantity of material discharged is in the order of 0.15 milliliter depending upon the restrained volume within the cup 152 and the degree of compression of its edge walls.

The serum-sorbent dispenser is arranged so that each serum-sorbent block 16 is advanced through each of the ten spaces after which the next following block 16 moves into the bottom most position ready to discharge its ten samples in sequence and push the preceding block onto discharge chute 20. It must be recognized that the arrangement and number of serum-sorbent reservoirs here disclosed is merely representative of a convenient size and number of conducting the present test. Single or additional reservoirs may be contained in each block or, if desired, the block can be one continuous strip, in which case the magazine feed arrangement of the loader 15 would then be eliminated. The number ten is selected and the five sorbent block magazine is correlated with the total number of magazines 14 held by both the loader and unloader and the total number of stations, namely 50, in the turntable. Therefore, with one loading of the machine, 50 complete tests may be performed without interruption. For continuous operation, additional sorbent blocks and additional magazines are of course added during operation of the apparatus.

The other reagent applicator of the apparatus is the conjugate applicator 35 shown in FIG. 2 represented schematically in FIG. 15 as including the reservoir 130 carrying the quantity of conjugate 131 as described hereinafter communicating through tube 132 and check valve 133 to cylinder 134 in the applicator 35. The chamber 134 communicates to an outlet tube 135 via check valve 136 similar to the valve 133. Cylinder 134 has a piston 137 operated by pneumatic actuator 138 between two fixed positions determined by double stop 139. The conjugate applicator is in effect a positive displacement pump which fills cylinder 134 on each downward stroke of piston 137 from the reservoir 130 and upon each return upward stroke discharges a fixed quantity, for example, 0.1 milliliter from the tube 135 which is positioned directly over the reaction spot of the slides when they reach the conjugate application station.

Figure 16:
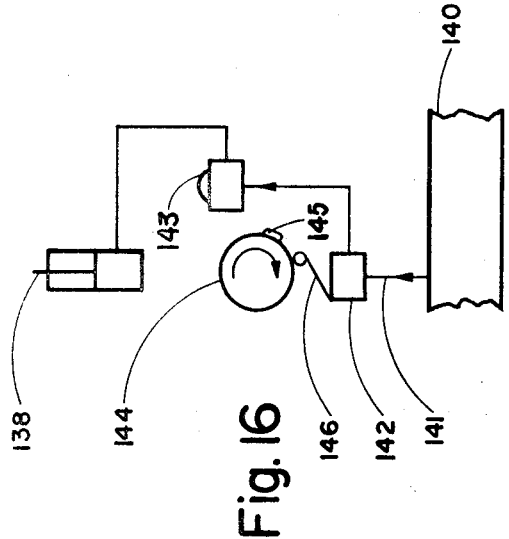
FIG. 16 is a simplified pneumatic schematic drawing of the conjugate applicator of FIG. 15.
Figure 15:
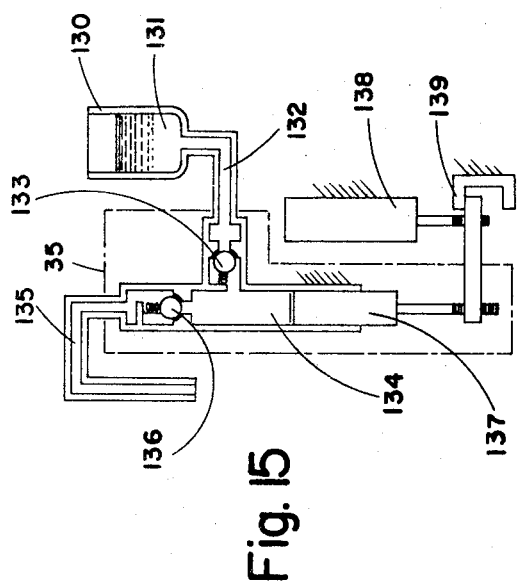
FIG. 15 is a simplified schematic of the conjugate applicator of FIG. 2.

The pneumatic actuator system for the conjugate applicator FIG. 15 may be seen in schematic form in FIG. 16. It is powered from a common manifold 140 maintained at a normal pressure of 30 p.s.i.g. Pressure from the manifold 140 is applied via feed line 141 and normally closed valve 142 and normally closed valve detent 143 controlling the flow of air to the actuator 138. The actuator 138 drives piston 137. It may be seen from FIG. 16 that the conjugate dispenser system is operative when the ball detent valve 143 is open and when a timing cam 144 driven by a common electric motor, hereinafter described, contacts its lobe 145 onto the actuating arm 146 of the normally closed valve 142. When lobe 145 rotates past arm 146 valve 142 returns to its normal closed position and pneumatic pressure in actuator 138 and valve 143 and 142 is vented to atmosphere through valve 142. At this time actuator 138 returns to its normal retracted position by virtue of an internal return spring.

A full comprehension of the sequence of operations may be had from the description below and in particular, FIG. 17 which shows the timing sequence of an entire cycle of the apparatus and FIGS. 19 and 20 respectively, show the electrical and pneumatic systems of the apparatus.

Figure 17:
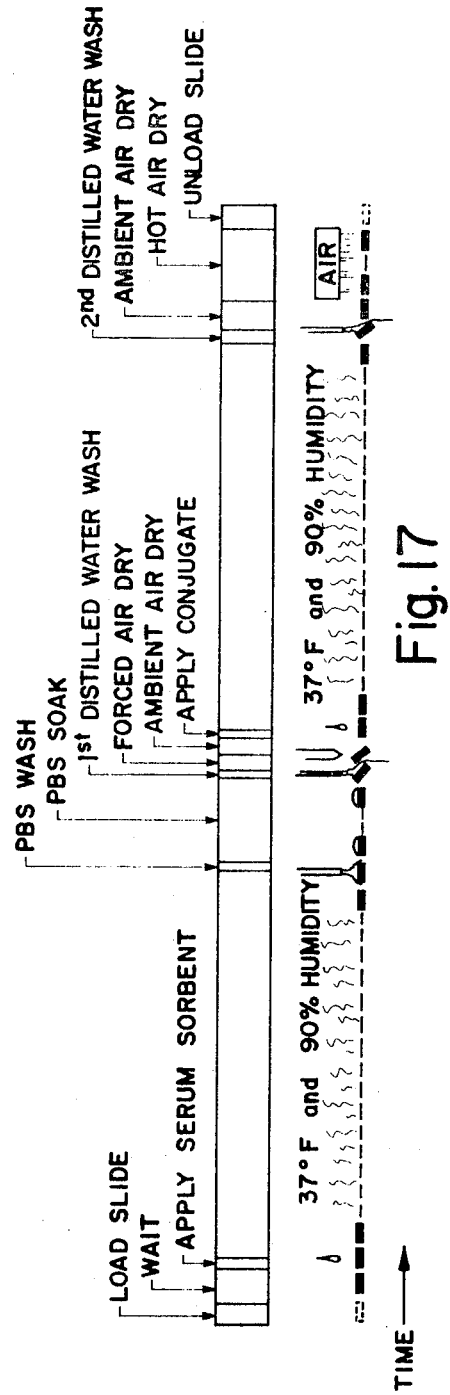
FIG. 17 is a time sequence diagram of the cycle operation of the apparatus of this invention.

Now referring to FIG. 17 which is a process timing diagram indicating in sequence the steps occurring during the FTA test. This figure depicts the operational steps accomplished, their relative duration and in simplest form a representation of a reaction slide and the conditions to which it is exposed during the operational cycle. The first operational step is to load the antigen coated slide on the turntable. After a waiting period during which the turntable takes two incremental advances, the slide is next advanced to a position beneath the serum-sorbent applicator where a drop of the mixture of human serum and sorbent material is dropped onto the reaction zone of the slide. With the next indexing of the turntable, the slide is moved into the first incubation chamber where it remains for approximately 30 minutes while passing through the chamber at 37° and 85–100% humidity, conditions ideal for any antibodies present in the blood serum to react and affix themselves to the antigenic material already fixed on the slide. The sorbent reacts with any nonspecific antibodies in the serum leaving only antibodies specific to *T. pallidum* for reaction with the fixed treponemes.

At the completion of the incubation period, the slide is moved out of the incubation chamber and is flushed for 6 seconds in a horizontal position with a wash solution of phosphate buffered saline. Thereafter the slide is advanced through five or six incremental advances (6–7 minutes) with the residual phosphate buffered saline solution held by surface tension on the reaction zone. This soak period allows the removal of serum background debris prior to being washed away by the next step where the slide is tilted and given a 30 second distilled water wash. At this station and upon termination of the wash a jet of air is applied to the slide which dries the reaction zone. The slide is advanced to the next step, returned to a horizontal position and a drop of conjugate (fluorescein isothiocyanate conjugated antihuman gamma globulin) is applied to the reaction zone and the slide moved into the second incubation chamber where the conjugate reacts with any human serum antibodies which may be presently attached to the fixed antigen. The antihuman gamma globulin carries a fluorescent tag in the form of the fluorescein isothiocyanate which produces a detectable glow when exposed to ultra violet light and is the basis for the ultimate readout after processing is completed on the apparatus of this invention.

After the second incubation of approximately 30 minutes the slide advances to the second wash station where it is tipped and flushed with distilled water and then dried by exposure to ambient drying and next by a blast of heated air. By the time the slide has advanced to the last station it is fully reacted and dried and ready for unloading into waiting magazines of FIG. 1 or the slide receiver of the apparatus of FIG. 2.

Figure 18:
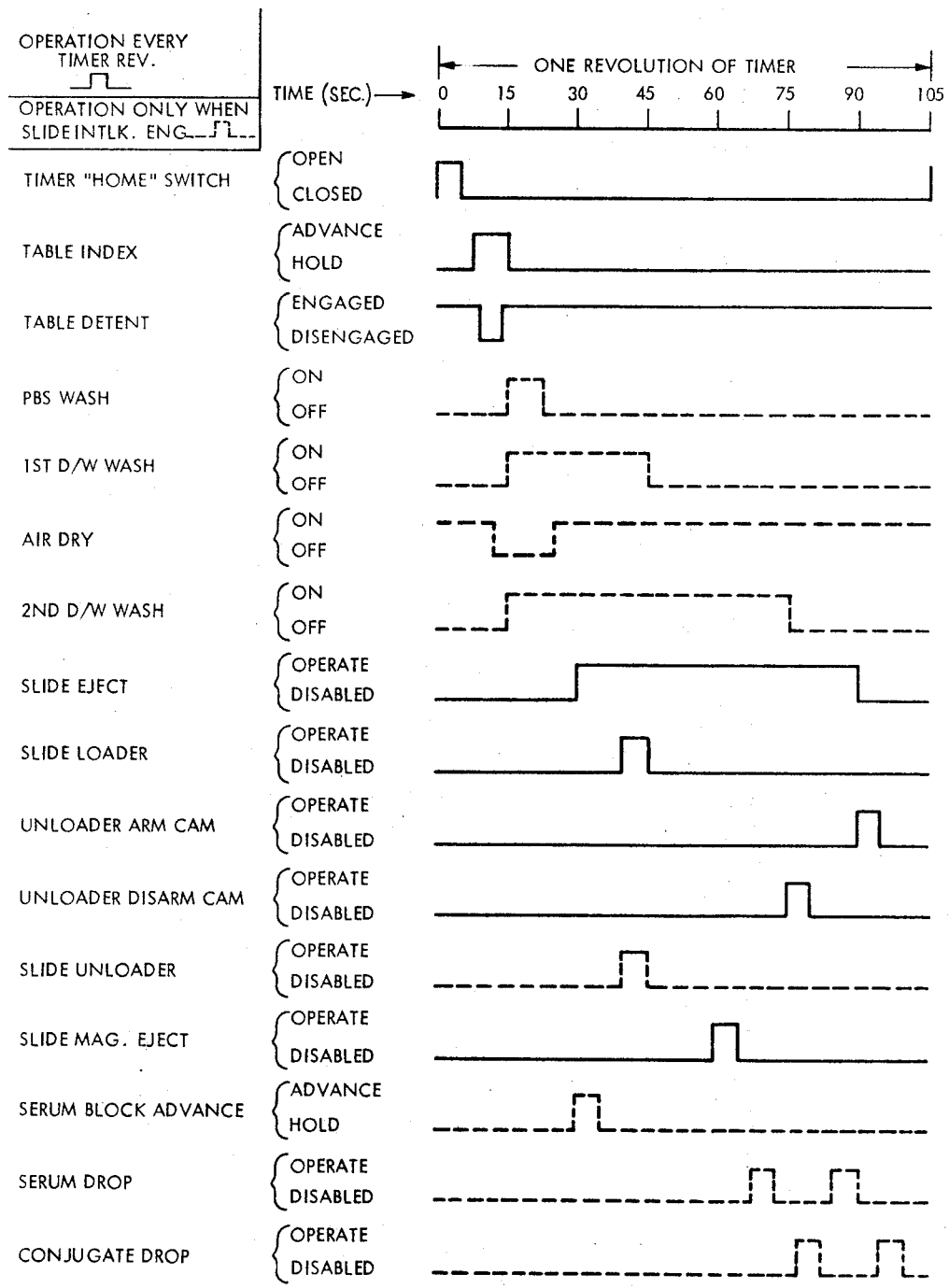
FIG. 18 is a time sequence diagram showing the condition of significant operating components of the system during a cycle of operation.
Figure 19:
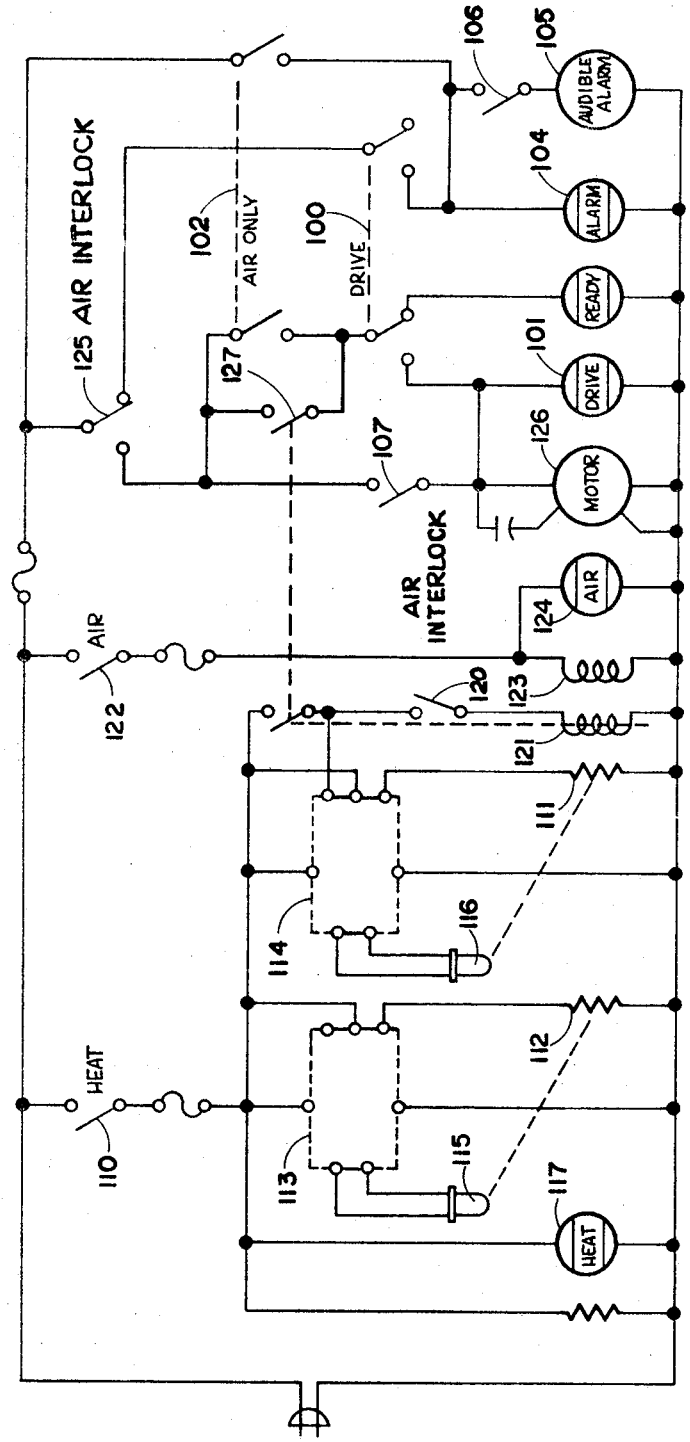
FIG. 19 is an electrical schematic of the apparatus of this invention.
Figure 20:
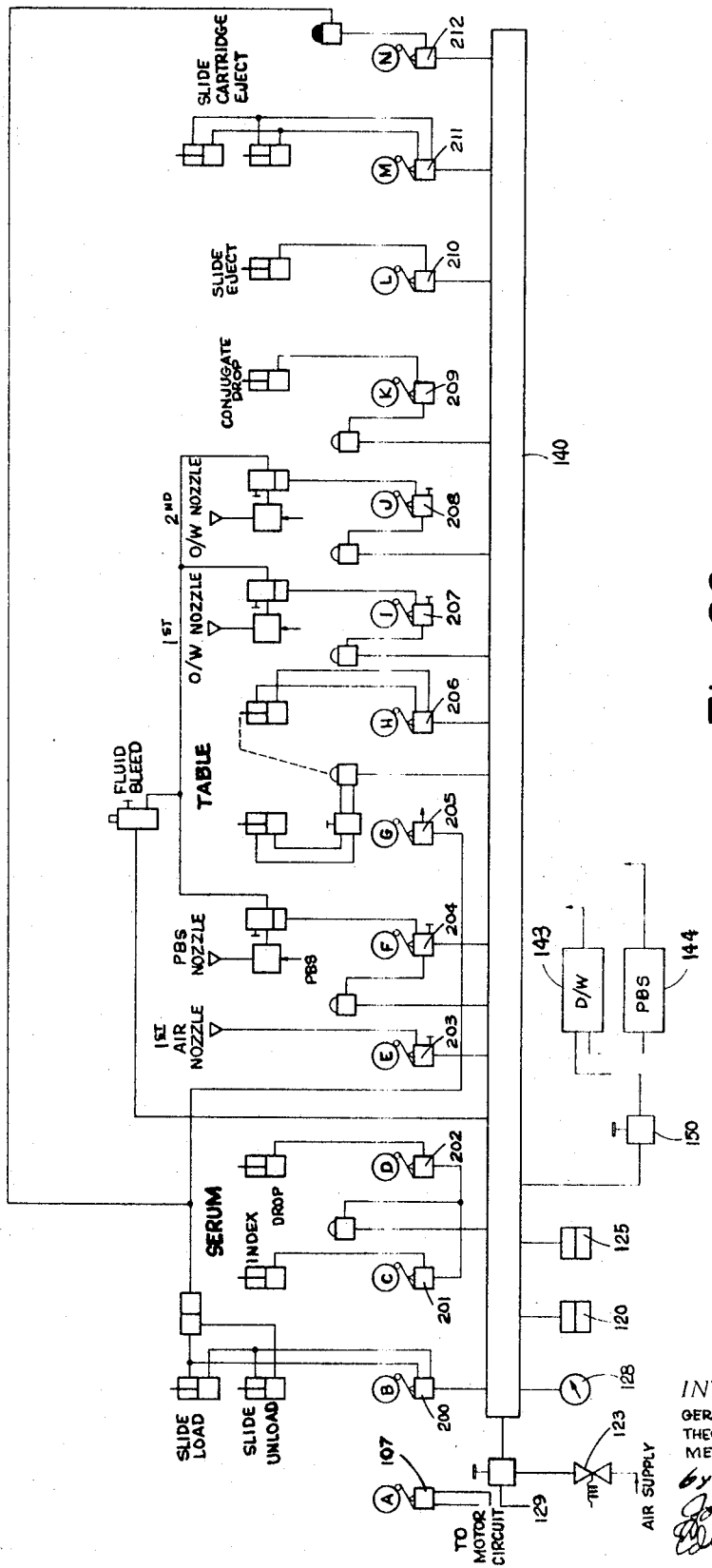
FIG. 20 is a pneumatic schematic of the apparatus of this invention.

The actuation of the apparatus of this invention is accomplished by the electrical subsystem of FIG. 19 and the pneumatic subsystem of FIG. 20 operating in the timing sequence shown in FIG. 18.

Referring now particularly to FIG. 19, the apparatus is conditioned for operation by actuation of temperature switch 110 which energizes immersion heaters 111 and 112 in the incubators 23 and 24. The temperature of the incubator air is controlled by temperature controller circuits 113 and 114 such as commercially available controllers Model 19–200,000–000 produced by Fenwal Inc. of Ashland, Mass. Thermistor probes 115 and 116 sense the air temperature in the respective incubators and provide the feedback input to the controllers 113 and 114. Closure of HEAT switch 110 also lights panel lamp 117 indicating heater ON. The switch 122 illuminates the AIR ON lamp 124 and operates the air solenoid valve coil 123 to apply air pressure to manifold 140 of FIG. 20, for operating all pneumatic devices in the apparatus and air pressure operated switches 120 and 125.

The air operated switch 125 shown in its system checkout position, when operated energizes the timer motor 126 through relay contact 127 and drive switch 100 which also lights DRIVE lamp 101. The system may be checked out without heat by operating the air switch 122, air only switch 102 and DRIVE switch 100. In such case ALARM light 104 will be illuminated indicating that the apparatus is not in condition to properly process slides. Optionally an audible alarm 105 may be enabled to sound under such conditions by closing switch 106. One additional switch in the electrical system is the timer motor position responsive switch 107 which maintains power to the timer motor 126 despite the opening of the drive switch until the completion of one timer cycle.

The electric system of FIG. 19 cooperates with the pneumatic system of FIG. 20 to operate the apparatus. The pneumatic system includes an air inlet from an external supply which through the air solenoid valve 123 and manual regulator 129 supplies manifold 140 with operating pressure for the system. The manifold pressure is indicated on gauge 128 and serves immediately to operate air switches 120 and 125 shown on FIG. 19 and to pressurize the phosphate buffered saline and distilled water reservoirs 143 and 144 respectively through pressure regulator 150. The manifold also is connected to a number of cam actuated valves 200–212 operated by cams B–N respectively all driven by the timer motor 126 of FIG. 17.

Certain of the cam operated valves, namely 201, 202, 204, 207, 208, 209 and 212 have interlocks which are depressed (opened) only when a slide is present in the position associated with the valve. For example, the position interlock valves prevent the dispensing of reagents unless a slide is present below the reagent outlet.

Each of the actuating cylinders controlled by the timer motor and respective cams are indicated in the drawing FIG. 20 and their sequence of operation identified on the timing sequence diagram FIG. 18. The timing diagram of FIG. 18 represents the phasing and duration of operation of each of the pneumatic actuators of FIG. 20 along with the single mechanical position responsive timer home switch 107 of FIGS. 19 and 20.

In FIG. 18 the solid lines indicate operations which occur each revolution of the timer motor while those shown in dashed line denote operations which occur only when the "slide present" interlock at the respective station is operated. Suffice it to say that with the operational switches of FIG. 19 actuated and air pressures applied to the apparatus, the system is in condition to repeat the cycle of FIG. 18 and perform the FTA (absorb) test in accordance with standard approved procedures.

From the foregoing description it may be seen that the apparatus of this invention is capable of automatically processing antigen coated slides to produce fluorescent tagged conjugated antigen whenever human serum samples applied to the slides contain antibodies indicating previous exposure to *T. pallidum*. Of course it is clear that one working within the scope of the teaching contained herein could modify the apparatus to perform modified FTA (absorb) tests or to perform other biological tests by substitution of reagents, adjusting reaction times and temperatures and any other changes dictated by the procedure. In any event such modifications employing the same or equivalent combinations as defined in the claims below shall be considered to constitute a practicing of this invention.

What is claimed is:

1. Biological reaction apparatus comprising
    a turntable including a plurality of laboratory slide receivers mounted at the periphery of the turntable,
    means for advancing individual laboratory slides in succession to engage a slide receiver whereby each slide is held by a receiver in a cantilevered position with a reaction zone extending outward from the turntable,
    incubator means positioned in arcuate relationship extending around the periphery of the turntable and having a slot entrance positioned to allow the entrance, passage and exit of a laboratory slide carried by the turntable, and
    means for ejecting the slide at the completion of one circuit on the turntable.

2. Biological reaction apparatus in accordance with claim 1 wherein a plurality of reagent dispenser stations positioned around the periphery of the turntable with outlets directed to apply reagents to the reaction zone of the slide, and
    means for advancing the turntable to expose the reaction zone of each slide to reagents.

3. Biological reaction apparatus comprising a turntable including a plurality of laboratory slide receivers mounted at the periphery of the turntable,
    means for advancing individual laboratory slides in succession to engage a slide receiver whereby each slide is held by a receiver in a cantilevered position with a reaction zone extending outward from the turntable,
    a plurality of reagent dispenser stations positioned around the periphery of the turntable with outlets directed to apply reagents to the reaction zone of the slide,
    means for advancing the turntable to expose the reaction zone of each slide to reagents,
    a plurality of wash stations positioned around the periphery of the turntable,
    means at said wash stations for deflecting the laboratory slide from the horizontal position to allow the free flow of wash fluid over the reaction zone,
    incubator means positioned in arcuate relationship extending around the periphery of the turntable and having a slot entrance positioned to allow the entrance, passage and exit of a laboratory slide carried by the turntable, and
    means for ejecting the slide at the completion of one circuit on the turntable.

4. Biological reaction apparatus in accordance with claim 3 wherein the apparatus includes means responsive to the presence of a slide at a reagent dispenser station for enabling the dispensing of reagents.

5. The combination in accordance with claim 3 wherein one of the said reagent dispensers comprises a rack for holding a plurality of liquid reagent samples each in respective cavities with bottom dispenser openings,
    means for sequentially moving the cavities in position over the reaction zone of respecive slides, and
    means for applying superatmospheric pressure to the opening of each cavity to cause the dispensing of the reagent onto the slide below.

6. Biological reaction apparatus comprising
    a turntable including a plurality of laboratory slide receivers mounted at the periphery of the turntable,
    means for advancing individual laboratory slides in succession to engage a slide receiver whereby each slide is held by a receiver in a cantilevered position with a reaction zone extending outward from the turntable,
    at least one reagent dispensing station positioned with a dispensing orifice above the reaction zone of laboratory slides carried by the turntable,
    means for advancing the turntable to expose the reaction zone of each slide to reagent,
    incubator means positioned in arcuate relationship extending around the periphery of the turntable and having a slot entrance positioned to allow the entrance, passage and exit of a laboratory slide carried by the turntable,
    at least one wash station including means for deflecting each laboratory slide from the horizontal to allow the free flow of wash fluid over the reaction zone,
    at least one drying station including means for passing a jet of air across each laboratory slide to dry the reaction zone, and
    means for ejecting the slide at the completion of one circuit on the turntable.

7. Biological reaction apparatus for producing the reaction between antigenic material fixed to a reaction zone of a laboratory slide and blood serum to detect the presence of antibodies specific to the antigenic material on the slide comprising
    a turntable including a plurality of laboratory slide receivers mounted at the periphery of the turntable,
    means for advancing individual laboratory slides in succession to engage a slide receiver whereby the slide is held by a receiver in a cantilevered position with an antigenic material extending outward from the turntable,
    means for dispensing onto the antigenic material on the slide a sample of blood serum,
    incubator means positioned in arcuate relationship extending around the periphery of the turntable and having a slot entrance positioned to allow the entrance, passage and exit of a laboratory slide carried by the turntable,
    said incubator means positioned for acceptance of slides after the dispensing of blood serum to the surface of the antigenic material,
    a wash station following said incubator means for washing unreacted material from the reaction zone, a second dispenser for applying antihuman gamma globulin conjugated with detectable tracer material, second incubator means positioned in arcuate relationship extending around the periphery of the turntable and having a slot entrance positioned to allow the entrance, passage and exit of a laboratory slide carried by the turntable, a second wash station positioned following the second incubator means for washing unreacted conjugate material from the reaction zone of each slide, said wash station including means for deflecting each laboratory slide from a horizontal position to allow the free flow of wash fluid over the reaction zone, means for drying each slide after passing the second wash station, and means for ejecting the slide at the completion of one circuit on the turntable.

References Cited
UNITED STATES PATENTS

| | | | |
|---|---|---|---|
| 3,129,144 | 4/1964 | Page et al. | 195—127 |
| 3,219,416 | 11/1965 | Natelson | 23—253 |

ALVIN E. TANENHOLTZ, Primary Examiner

U.S. Cl. X.R.

195—139, 103.5; 23—253; 222—416